(12) United States Patent
Paraskevakos

(10) Patent No.: US 7,567,698 B2
(45) Date of Patent: Jul. 28, 2009

(54) DEVICE AND METHOD FOR PREVENTING COUNTERFEITING USING A CURRENCY SERIAL NUMBER READER

(75) Inventor: Theodore G. Paraskevakos, Towson, MD (US)

(73) Assignee: iCVn, Inc., Timonium, MD (US)

( * ) Notice: Subject to any disclaimer, the term of this patent is extended or adjusted under 35 U.S.C. 154(b) by 0 days.

(21) Appl. No.: 11/819,887

(22) Filed: Jun. 29, 2007

(65) Prior Publication Data

US 2008/0037856 A1 Feb. 14, 2008

Related U.S. Application Data

(60) Provisional application No. 60/817,106, filed on Jun. 29, 2006.

(51) Int. Cl.
*G06K 9/00* (2006.01)

(52) U.S. Cl. .......................................... 382/135; 356/71

(58) Field of Classification Search .................. 382/135, 382/136, 137, 138; 356/71
See application file for complete search history.

(56) References Cited

U.S. PATENT DOCUMENTS

| | | |
|---|---|---|
| 3,727,003 A | 4/1973 | Paraskevakos |
| 3,812,296 A | 5/1974 | Paraskevakos |
| 5,616,902 A | 4/1997 | Cooley et al. ................ 235/380 |
| 6,065,672 A | 5/2000 | Haycock ..................... 235/379 |
| 6,109,522 A * | 8/2000 | Force et al. .................. 235/379 |
| 6,131,718 A | 10/2000 | Witschorik .................. 194/206 |
| 6,145,738 A | 11/2000 | Stinson et al. .............. 235/379 |
| 6,317,650 B1 | 11/2001 | Powell et al. ............... 700/236 |
| 6,550,671 B1 | 4/2003 | Brown et al. ................ 235/379 |
| 6,603,871 B2 * | 8/2003 | Liang ......................... 382/135 |
| 6,661,910 B2 | 12/2003 | Jones et al. ................. 382/135 |
| 6,783,061 B2 | 8/2004 | Graef et al. ................. 235/379 |
| 7,006,664 B2 | 2/2006 | Paraskevakos |
| 2002/0194124 A1 | 12/2002 | Hobbs et al. .................. 705/39 |
| 2003/0210386 A1* | 11/2003 | Laskowski ................... 356/71 |
| 2004/0232217 A1 | 11/2004 | Graef et al. ................. 235/379 |
| 2004/0255354 A1* | 12/2004 | Graef et al. ..................... 902/8 |
| 2007/0235079 A1 | 10/2007 | Paraskevakos ........... 137/15.14 |

* cited by examiner

*Primary Examiner*—Brian P Werner
*Assistant Examiner*—Claire Wang
(74) *Attorney, Agent, or Firm*—Pillsbury Winthrop Shaw Pittman LLP

(57) ABSTRACT

A device and method for reading and authenticating currency serial numbers to prevent counterfeiting and other money-related crime is provided. The device may be retrofitted to be installed in an existing money counting machine, and may read serial numbers of currency that passes through the counting machine. The serial numbers can be captured from stationary currency prior to entering the counting machine, and the serial numbers may be authenticated by comparing the number against various databases.

25 Claims, 3 Drawing Sheets

DEVICE AND METHOD FOR PREVENTING COUNTERFEITING USING A CURRENCY SERIAL NUMBER READER

CROSS-REFERENCE TO RELATED APPLICATIONS

This application claims the benefit of U.S. Provisional Patent Application Ser. No. 60/817,106, entitled "Method and Device for Currency Serial Number Reader," filed Jun. 29, 2006, the disclosure of which is hereby incorporated by reference in its entirety.

FIELD OF THE INVENTION

The invention relates to reading and authenticating currency serial numbers to prevent counterfeiting and other money-related crime.

BACKGROUND OF THE INVENTION

Since the inception of the use of paper money, central banks and governments have struggled to protect currencies from counterfeiting. Even so, perpetrators often exploit new technologies to duplicate the security features of legitimate currencies. As such, central banks and governments often struggle to stay one step ahead of counterfeiters. One technique for preventing counterfeiting, armed robbery, money laundering, extortion, terrorism, embezzlement, and other money related crimes relates to undermining the anonymity of cash. For instance, as discussed in U.S. Pat. No. 3,727,003, entitled "Decoding and Display Apparatus for Groups of Pulse Trains," issued Apr. 10, 1973, and U.S. Pat. No. 3,812,296, entitled "Apparatus for Generating and Transmitting Digital Information," issued May 21, 1974, the disclosures of which are hereby incorporated by reference in their entirety, preventing fraud and other crime by undermining the anonymity of telephony has been highly successful in crime in Caller* ID® systems, which today significantly deter telephone related crime world-wide by removing the anonymity of the caller's telephone number.

Because counterfeiters often duplicate existing serial numbers, or use serial numbers out of range for the banknote's denomination, the anonymity of currency can be removed by effectively reading and authenticating the serial number. The serial number can be used to scientifically and positively determine the perpetrator's attempts to counterfeit currency, as perpetrators would have to invent new serial numbers to get around the system, a logically impracticable or difficult task. Nonetheless, existing systems cannot adequately perform such reading and authentication, leading to less than optimal counterfeit prevention. For example, counterfeiters sometimes create "Supernotes," near perfect counterfeit bills printed, perhaps, by unfriendly countries and circulated outside of the United States. Creators of "Supernotes" have, from time to time, deliberately circulated "Supernotes" with small detectable imperfections to divert the attention of the authorities. Presently, existing systems are unable to detect these notes, leaving absolutely perfect "Supernotes" to circulate undetected.

Existing systems suffer from these and other problems.

SUMMARY OF THE INVENTION

According to various aspects of the invention, a device and method for reading and authenticating currency serial numbers to prevent counterfeiting and other money-related crime may address these and other drawbacks of existing systems. The method may include identifying currency that has been used in unlawful activity by, for example, obtaining an image of a currency document, capturing a serial number of the currency document from the obtained image, comparing the captured serial number against one or more lists of wanted serial numbers, and identifying the currency document as having been used in unlawful activity based on the comparison. In various implementations, the captured serial number may be associated with a tag that includes identification information relating to a money exchange transaction in which the currency document was used. The image may be obtained and/or the serial number captured when the money exchange transaction occurs. For example, the money exchange transaction may occur at a retail point-of-sale (e.g., a gasoline station), or when a financial institution processes a deposit of the currency document, or in other ways. The serial number may be communicated to a local or remote data repository for storage, where the data repository may receive and store captured serial numbers from a plurality of sources. As such, the serial numbers stored in the data repository may be analyzed to identify duplicate serial numbers, which may be indicative of likely counterfeit activity, or for other potential indicators of fraudulent or criminal activity.

Other objects and advantages of the invention will be apparent to those skilled in the art based on the following drawings and detailed description.

DETAILED DESCRIPTION

Figure 1:
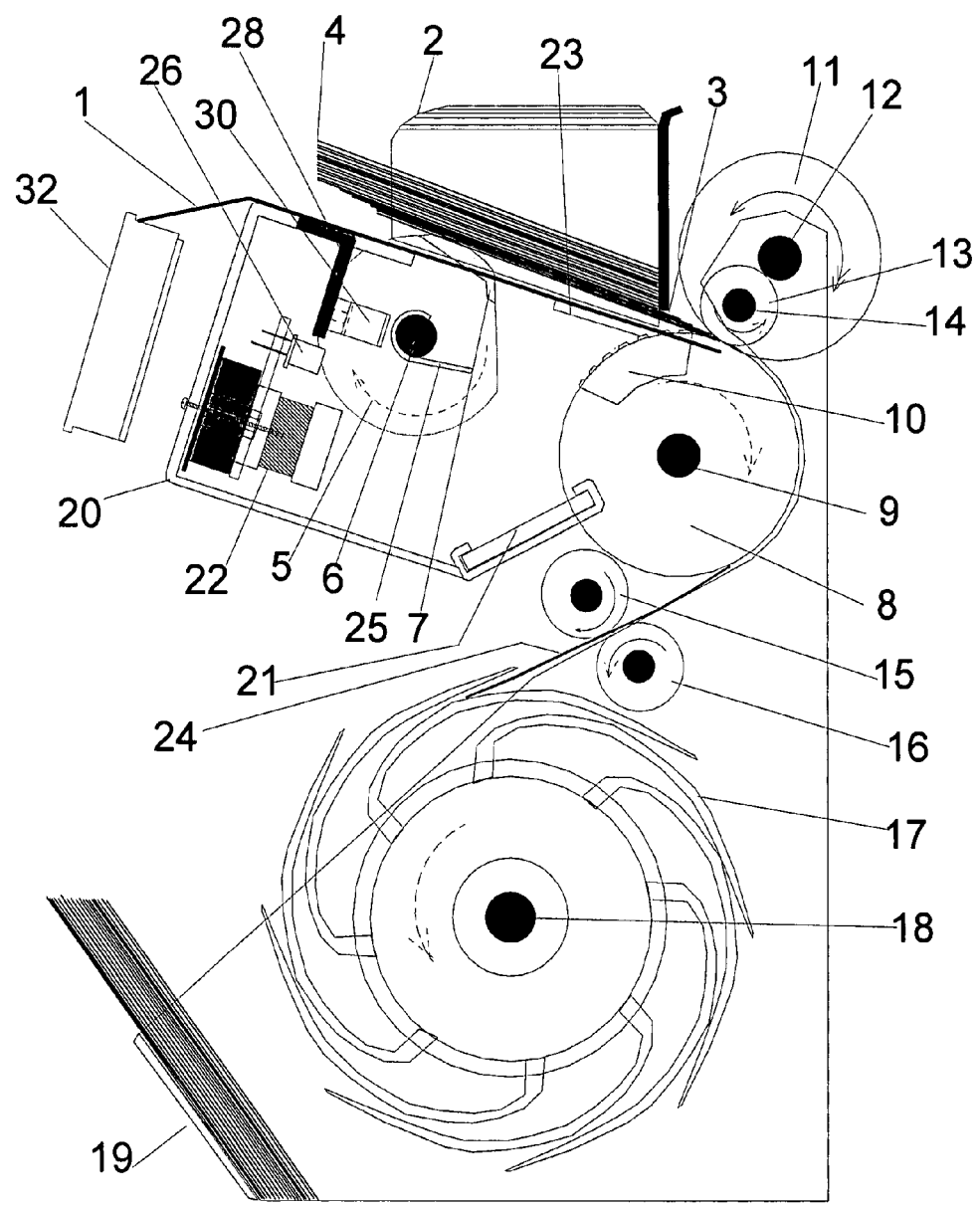
FIG. 1 illustrates a view of an exemplary existing money counting machine.

Referring to FIG. 1, a diagram illustrates an exemplary existing money counting machine. Many existing money counting machines, such as the machine illustrated in FIG. 1, accept one or more currency bills 4 along a longer dimension of the bills. As such, the bills 4 can pass through the machine in a shortest possible path, allowing for a faster counting operation. For example, as shown in FIG. 1, one or more currency documents or bills 4 may rest on a plate 1, which may be disposed between one or more money guides 2. The bills 4, assisted by one or more wheels 5 that rotate along respective axles 6, advance into the counting machine. The wheels 5 may be made of plastic, or a similarly suitable material, and an outer portion of the wheels 5 may be covered by a softer material 7 (e.g., a pliable plastic, or other soft material). The outer portion of the wheels 5 will typically be longer than a length of the bills 4, such that every full turn of the wheels 5 pushes an adjacent one of the bills 4 into a counting portion of the machine. Because of the longer circumference of the wheels 5, as compared to the length of the bills 4, a space may exist between each of the bills 4, enabling the bills 4 to be separately counted with accuracy.

As the bills 4 pass through an opening 3 of the guide 2, the bills 4 reach another wheel 13 rotating around an axle 14. The opening 3 may allow multiple bills 4 to pass through, and the bills may stop or otherwise register at an edge of a raffle wheel 11 that rotates along an axle 12. In various implementations, the raffle wheel 11 may stop movement of the bills 4 by remaining stationary rather than rotating. Thus, a plurality of bills 4 can register at an edge of the wheels 13 and 11 one at a time, forming a stack of bills 4. Aided by a softer portion 10 of the wheel 8, the bottom bill 4 in the stack may enter into a counting section of the machine. For example, subsequent to the wheels 5 pushing the bill 4 through the opening 3 by way of the soft portion 7, the wheel 9, using the soft portion 10, can pick up the bottom bill 4 in the stack and push the bill 4 through the counting mechanism. Because the raffle wheel 11 ensures that bills 4 pass through one at a time, the remaining bills 4 in the stack stay in the registered position for at least one full revolution of the wheels 8 and 5. The bill 4 being counted follows the counting path, through wheels 15 and 16, prior to registering in a bill position 24. The bill 4 can then be pushed by a stacker wheel 17, which rotates around an axle 18 prior to ending up in a stacker 19. During that time, the bill can be counted and may pass through several sensors that enforce security measures (e.g., checking for watermarks).

While bills 4 in the stack remain in the registered position, the bottom bill 4 remains stationary between the wheel 8 and the raffle wheel 11 while waiting for the wheel 8 to finish a full rotation. While the bill 4 remains stationary, prior to being counted, a picture or other image of the bill 4 may be captured through a window 23 by way of a camera 22, or other image capturing device. The camera 22 may be fastened to a bracket 20 and aimed at a mirror 21 that reflects or otherwise displays the image of the bottom bill 4 through the window 23. An "interrupter finger" 25 may be attached to the axle 6 of the wheels 5, and may rotate together with the axle 6. Once per revolution of the axle 6, the interrupter finger 25 may pass through an optical interrupter 30 fastened to a bracket 28. When the optical interrupter 30 triggers, a circuit coupled thereto may cause the camera 22 to take a picture of the bottom bill 4 in the registered position (e.g., by way of the reflected image in the mirror 21). The picture may be taken subsequent to the entire bill 4 going through the machine's counting space, and prior to when the soft portion 7 of the wheels 5 pushes the bill 4 out of the registered position. As such, the picture may be taken of stationary currency, prior to the currency entering the machine for counting, ensuring optimal conditions for a clear and high-quality image capture. However, it will be apparent that other suitable arrangements can be used, such as taking the picture when a counting cycle ends (e.g., when the bill 4 exits the counting mechanism, or otherwise). Further, in various implementations, the camera 22 may be a high-quality camera capable of taking high-resolution images (e.g., raw data), and capable of taking a significant number of pictures in a short time frame (e.g., greater than twenty pictures per second). As a point of reference, the camera 22 may capture a similar number of flaps per second (fps) as a video camera, which can typically take approximately 30 fps. Moreover, it will be apparent that such an approach can work with other types of counters (e.g., feeding from the top of the money stack, in which case, the camera 22 snaps the picture of the top bill 4 before entering the reading section of the machine).

Figure 2:
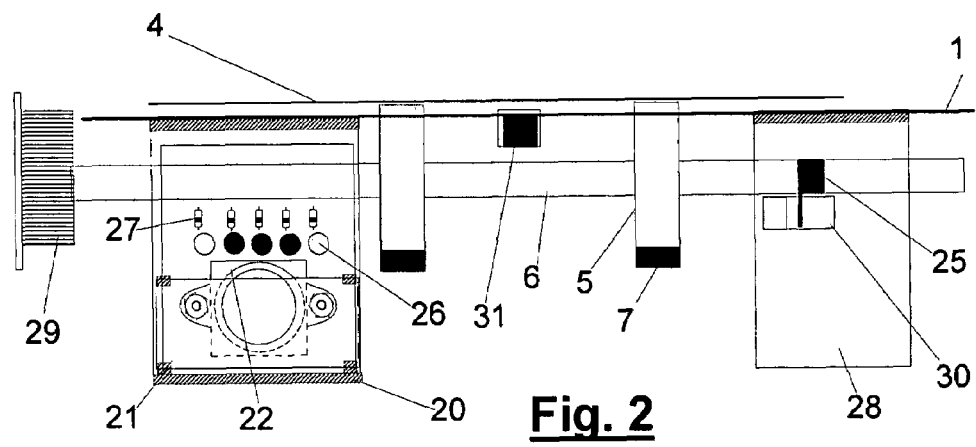
FIGS. 2-3 illustrate views of an exemplary device for reading currency serial numbers according to various aspects of the invention.
Figure 3:
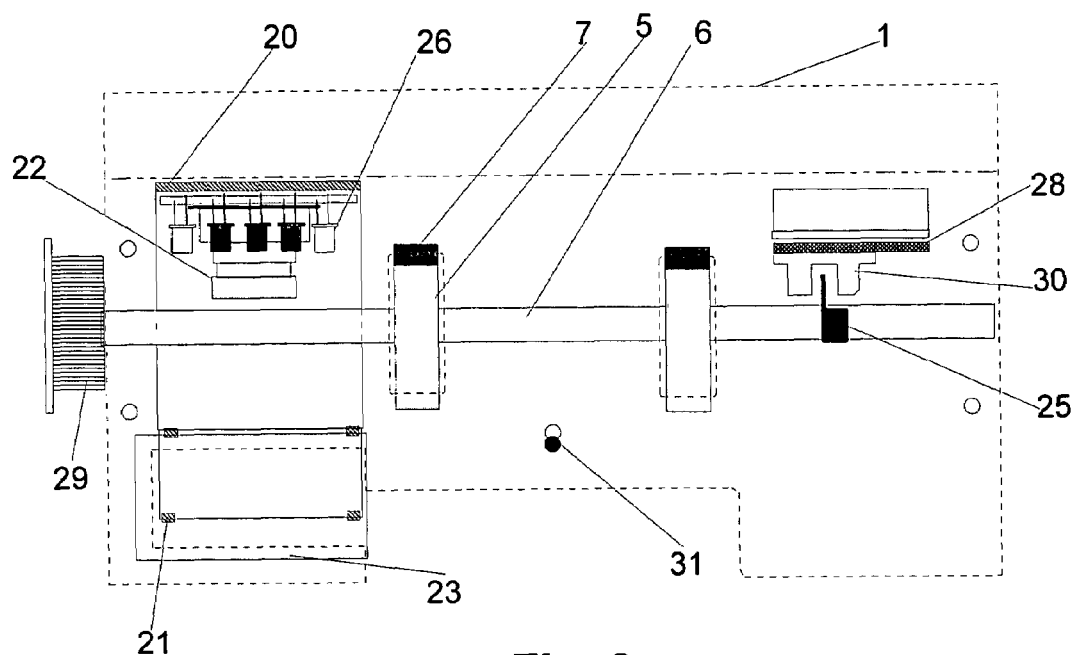

Referring to FIGS. 2-3, various diagrams illustrate an exemplary retrofit device for reading currency serial numbers according to various aspects of the invention. As shown in FIGS. 2-3, the bracket 20 may be fastened to the plate 1, and the currency bills 4 rest on top of the wheels 5. The wheels 5 rotate via axles 6, driven by power attached to a pulley gear 29. For the illustrated particular example, currency may be placed face-down and head-first to ensure that the serial number on the upper left side of the currency bill 4 will be visible to the camera 22 for image capture. The picture of the serial number may be taken with the camera 22 upon the interrupter finger 25 passing through the interrupter sensor 30.

In various implementations, a portion of the bill 4 may be illuminated using light emitting diodes (LEDs) 26 to improve lighting for the picture and ensure an optimal quality image. The light intensity of the LEDs 26 may controlled by one or more resistors 27. As will be apparent, photographing an object positioned very close to the camera 22 may require use of a wide-angle lens or "fisheye" lenses. Wide-angle lenses, however, have a picture distortion element where a picture's center tends to be brighter than its edges. As such, the LEDs 26 may be positioned or otherwise be designed to illuminate the bill 4 by diffused and uneven light (e.g., to compensate for "fisheye" effects of a camera lens), where the light may be brighter on the edges and darker in the center. For example, a number of different illumination levels may be used (e.g., three), where the illumination level may be directly correlated to the lens geometry. However, many commercially available LEDs come with a water clear color and a dome tip to better concentrate the light emitted therefrom. Therefore, in order to avoid spot light points from the LEDs 26, the tips may be removed from the LEDs 26 (e.g., via a grinding process), such that the light emitted from the ends will be diffused. It will be apparent, however, that specially constructed LEDs that emit diffused light may be used.

In typical operation, counting machines may employ an optical sensor 31 installed in the plate 1. When the bills 4 have been placed on top of the plate 1, the sensor 31 triggers the counting process, which may be monitored via a control panel 32. In various instances, the camera 22 may be triggered when the sensor 31 covers the bills 4 (e.g., via the photo interrupter 30 when the interrupter finger 25 passes through the interrupter 30). When the last bill 4 passes through the counting machine and the photo sensor 31 becomes uncovered, an enable signal would no longer be provided to the camera 22, and the interrupter finger 25 would no longer trigger the camera 22 to take pictures because no bills remain for counting. The enable signal from the photo sensor 31 can also signal the LEDs 26 to turn on, and when the bills 4 no longer cover the sensor 31, the enable signal may be cut-off, signaling the LEDs 26 to turn off.

It will be apparent that the described sequence can be entirely mechanical, as described, or the sequence can be controlled through a microprocessor control system, or any suitable combination thereof. For example, a controller or other control system may be implemented to perform other related tasks and provide additional functionality (e.g., adjusting an intensity of light used to illuminate the bills 4). For example, the controller, microprocessor, or other software routine can be used to control current that drives through the resistors 27, which can turn on the LEDs 26 every time a bill 4 comes into position (e.g., creating a strobe effect for better and crisper pictures). For instance, it will be apparent that crisper pictures or images may simplify optical character recognition (OCR) or other techniques for capturing serial numbers. However, the serial number image capture should be as fast as possible, as an amount of time between bills 4 passing through the image-capture portion may be limited. Thus, in various implementations, the system may be more effective by translating the picture or image to an American Standard Code for Information Interchange (ASCII) serial number, enabling the number to be compared to one or more databases compiled from various sources of wanted or otherwise fraudulent serial numbers (e.g., serial numbers involving illegal activities), or in other ways. For example, in one or more implementations, currency may be recognized and validated based on a uniqueness of a serial number, where duplicate serial numbers may be relevant for counterfeit deterrent purposes, or in other ways.

Figure 4:
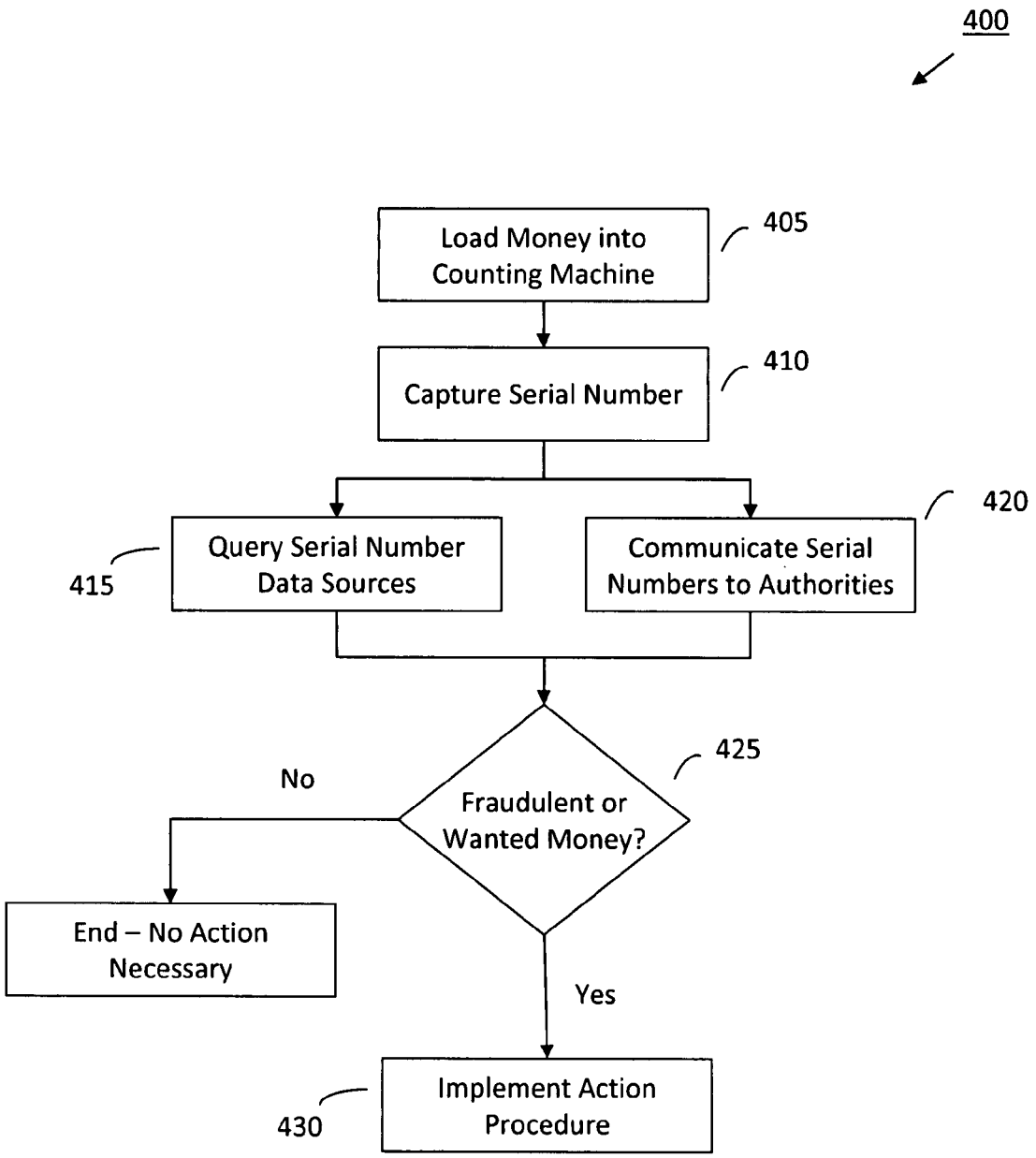
FIG. 4 illustrates a flowchart of an exemplary method for reading and authenticating currency serial numbers according to various aspects of the invention.

Referring to FIG. 4, a flowchart illustrates an exemplary method 400 for reading and authenticating currency serial numbers according to various aspects of the invention. Method 400 may be used in conjunction with a system that retrofits one or more existing money counting machines to read currency serial numbers (e.g., via image capture) as the currency passes through the machines. For example, various techniques for retrofitting existing machines may be based on those described in U.S. Pat. No. 7,006,664, entitled "Intelligent Currency Validation Network," issued Feb. 28, 2006, or co-pending U.S. patent application Ser. No. 11/407,962, entitled "System and Method For Intelligent Currency Validation," filed Apr. 21, 2006, the disclosures of which are hereby incorporated by reference in their entirety.

For example, in various implementations of the invention, the retrofit system may include a mechanism for attaching to or extending an existing money counting machine as an add-on device that enables reading currency serial numbers. However, it will be apparent that a new counting machine employing similar concepts of capturing serial numbers can be designed from inception. For instance, beginning in an operation 405, money to be counted may be loaded into a money counting machine having a capability of taking a "snap" or a stationary picture of the money prior to individual currency documents entering the counting section of the machine. As such, an inexpensive, ordinary camera can be used in an operation 410 to capture a serial number of the stationary currency. By ensuring that the currency remains stationary during the picture, expensive cameras used to take pictures "on the fly" using stroboscopic expensive lights need not be employed. It will be apparent, however, that such cameras may be used without departing from the inventive concepts described herein, and that the system may be used with any currency regardless of shape, size and language.

Upon capturing the serial number, the captured serial numbers may be associated with an attached tag file including identification information (e.g., time of transaction, location of the point of sale, or other information deemed valuable by the appropriate authorities). The captured serial number data can then be queried against various currency databases in an operation 415, and further provided to appropriate authorities for comparison against available lists of wanted money in an operation 420.

For instance, an exemplary process for targeting criminal activity may include authorities tagging wanted money to catch criminals or other perpetrators, for example, by scanning money allocated for use as "buy money" or "Trojan horse" money. The authorities (e.g., police officers, law enforcement officers, etc.) may designate an agent to use the scanned "buy money" in an undercover drug deal, a sting operation, or other criminal activity. Subsequent to the agent using the buy money in the drug deal, sting operation, or other criminal activity, the criminal may use the "buy money" to purchase products from various points of sale (e.g., gasoline stations). The point of sale may preferably employ a closed-circuit television surveillance system (e.g., for its own security), and may deposit daily cash proceeds (e.g., directly to a financial institution, through an armored car service, or otherwise). The depository financial institution, in order to credit the depositors' account, would run the currency through a counter/scanner (RAD) to verify a deposit amount, while also capturing serial number and transaction data from the deposited funds. Further, by having and storing the serial numbers, banks and other financial institutions may be protected from armed robberies, for example, because the currency may easily be located when it passes through a serial number reader at another point-of-sale. The financial institution would transmit the data to the proper local authorities, either automatically or manually, and when local authorities find the "buy money" among the deposited funds (e.g., in an operation 425), they can implement an action procedure in an operation 430 to apprehend the user of the "buy money." For example, the action procedure could include acquiring the CCTV tapes from the point-of-sale using the transaction identification information to identify the user of the "buy money." Further, the local authorities or the point-of-sale can send the data to a centrally located data hub, which may also receive data from other locations. The hub may include a process for cross-checking the data to determine whether the currency includes any indicators of fraudulent activity (e.g., duplicate serial numbers, or money used in illegal activities such as armed robberies, extortion, terrorism, money laundering, etc.). When such fraudulent activity has been detected, the local authorities can, if necessary, take appropriate action in operation 430. For example, a point-of-sale currency reading device may be installed in any point-of-sale that has received fraudulent or wanted money, and video and/or voice recording devices may be coupled thereto for automatically initiating recording of a patron when detecting subsequent fraudulent or wanted money.

The system described herein may have broad applicability, including an ability to detect "Supernotes" or penetrate various money exchange schemes. For example, a centuries-old currency exchange system, Hawala, includes transferring money from place to place outside of a legitimate banking system. The Hawala system tends to be very popular in money laundering schemes, drug trafficking, and terrorist financing, and other criminal activity. The system described herein may be used to penetrate such a scheme by, for example, an undercover agent seeking a Hawaladar (e.g., a money launderer) in order to send money to another undercover agent in a remote location (e.g., the "Trojan Horse Scheme"). The sending agent hands previously scanned money to the Hawaladar, who collects a commission. The Hawaladar will likely communicate with another Hawaladar closer to the receiving agent, who hands a different batch of local currency to the receiving agent. This process may be repeated several times, each time using an adequate amount of money, with only the cost to law enforcement officers or taxpayers being the commission paid to the Hawaladars. As such, the Hawaladars will likely eventually use the scanned cash with recorded serial numbers to serve other customers. The cash will eventually be utilized to buy groceries, gasoline, and other products from a point-of-sale that includes a serial number reader in communication with the central hub, the appropriate authorities, or both, resulting in identification of the Hawaladars' customers (i.e., criminals or others likely to launder money).

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that one skilled in the art may effect such feature, structure, or characteristic in connection with other aspects or implementations, whether or not explicitly described. Thus, various changes and modifications may be made to the disclosure provided herein, without departing from the scope and spirit of the invention. The specification and drawings are to be regarded as exemplary only, and the scope of the invention is to be determined solely by the appended claims.

What is claimed is:

1. A method for identifying currency that has been used in unlawful activity, comprising:
obtaining an image of a currency document using a device coupled to a money-counting machine, wherein the device includes:
an entry stage that holds a plurality of stationary documents in a stack arrangement;
an image-capturing device having an image plane extending forwardly from the entry stage, the image-capturing device arranged such that a top or a bottom one of the plurality of stacked documents is visible in the image plane;
a rotating member coupled to the entry stage that retrieves one of the plurality of documents per rotation and guides the retrieved document into the counting machine; and
a synchronization mechanism that triggers the image-capturing device once per rotation of the rotating member, such that the image-capturing device captures an image of each document in the stack prior to the document passing into the counting machine;
capturing a serial number of the currency document from the obtained image using a microprocessor;
comparing the captured serial number against one or more lists of wanted serial number using the microprocessor; and
identifying the currency document as having been used in unlawful activity based on the comparison performed using the microprocessor.

2. The method of claim 1, further comprising associating the captured serial number with a tag, the tag including identification information relating to a money exchange transaction in which the currency document was used.

3. The method of claim 2, wherein the image is obtained and/or the serial number is captured when the money exchange transaction occurs.

4. The method of claim 3, wherein the money exchange transaction occurs at a retail point-of-sale.

5. The method of claim 3, wherein the money exchange transaction occurs at a gasoline station.

6. The method of claim 2, further comprising communicating the captured serial number to a financial institution.

7. The method of claim 6, wherein the image is obtained and/or the serial number is captured when the financial institution processes a deposit of the currency document.

8. The method of claim 1, further comprising:
communicating the captured serial number to a data repository for storage, wherein the data repository receives and stores captured serial numbers from a plurality of sources; and
analyzing the serial numbers stored in the data repository to identify duplicate serial numbers.

9. The method of claim 8, wherein the data repository further receives and stores the lists of wanted serial numbers.

10. The method of claim 1, wherein the image-capturing device comprises a camera.

11. The method of claim 1, wherein the image-capturing device obtains the image when the currency document is visible in a stationary position within the image plane.

12. The method of claim 11, wherein the currency document is in the stationary position at the entry stage of the device, prior to being counted in the counting machine.

13. The method of claim 11, wherein the currency document is stacked in a stationary position after passing through and being counted in the counting device machine.

14. A method for penetrating criminal networks, comprising:
adding a serial number of a currency document to one or more lists of wanted serial numbers stored in a data repository, wherein the currency document has been designated for use in an undercover operation for catching suspected criminals;
receiving data that includes the serial number and an associated tag identifying a money exchange transaction in which the currency document was used, wherein the data is received at a microprocessor from a first entity that obtained an image of the currency document using a device coupled to a money-counting machine, wherein the device includes:
an entry stage that holds a plurality of stationary documents in a stack arrangement;
an image-capturing device having an image plane extending forwardly from the entry stage, the image-capturing device arranged such that a top or a bottom one of the plurality of stacked documents is visible in the image plane;
a rotating member coupled to the entry stage that retrieves one of the plurality of documents per rotation and guides the retrieved document into the counting machine; and
a synchronization mechanism that triggers the image-capturing device once per rotation of the rotating member, such that the image-capturing device captures an image of each document in the stack prior to the document passing into the counting machine; and
identifying a second entity associated with the money exchange transaction as a suspected criminal using the microprocessor.

15. The method of claim 14, wherein the undercover operation includes a Trojan Horse scheme to penetrate a Hawala money laundering scheme, wherein penetration of the money laundering scheme includes:
scanning the currency document using the device to obtain an image of the serial number, wherein a first undercover agent delivers the scanned currency document to a suspected money launderer, and wherein the first undercover agent further arranges for the suspected money launderer to pay money to a second undercover agent.

16. A device for capturing an image of a stationary document prior to the document entering a money-counting machine coupled to the device, wherein the device comprises:
an entry stage that holds a plurality of stationary documents in a stack arrangement;
an image-capturing device having an image plane extending forwardly from the entry stage the image-capturing device arranged such that a top or a bottom one of the plurality of stacked documents is visible in the image plane;
a rotating member coupled to the entry stage that retrieves one of the plurality of documents per rotation and guides the retrieved document into the counting machine; and
a synchronization mechanism that triggers the image-capturing device once per rotation of the rotating member, such that the image-capturing device captures an image of each document in the stack prior to the document passing into the counting machine.

17. The device of claim 16, further comprising:
a light emitter that emits light for illuminating the top or the bottom one of the stacked stationary documents; and an adjustment mechanism for adjusting the light emitted by the light emitter.

18. The device of claim 17, the light emitter device including one or more light emitting diodes.

19. The device of claim 18, wherein at least one of the light emitting diodes emit uniform, diffused light from a grounded tip.

20. The device of claim 17, wherein the light emitter emits light in an uneven pattern to compensate for a fisheye effect of the image-capturing device.

21. The device of claim 17, wherein adjusting the emitted light includes varying an intensity of the light emitted by the light emitter.

22. The device of claim 16, wherein the device is retrofitted to the money-counting machine.

23. The device of claim 16, wherein the entry stage includes an area through which one of the stacked documents can be viewed, the device further comprising:

a mirror arranged to reflect an image of the one of the stacked documents viewable through the area, wherein the image plane of the image-capturing device is directed at the mirror.

24. The device of claim 23, wherein the area through which the one of the stacked documents can be viewed includes a transparent window.

25. The device of claim 16, further comprising one or more transparent window covers for covering one or more optical elements.

* * * * *